US012216705B2

(12) United States Patent
Huang et al.

(10) Patent No.: US 12,216,705 B2
(45) Date of Patent: Feb. 4, 2025

(54) SYSTEM AND METHOD FOR ATTRIBUTE-BASED VISUAL SEARCH OVER A COMPUTER COMMUNICATION NETWORK

(71) Applicant: Microsoft Technology Licensing, LLC, Redmond, WA (US)

(72) Inventors: Li Huang, Redmond, WA (US); Meenaz Merchant, Redmond, WA (US); Houdong Hu, Redmond, WA (US); Arun Sacheti, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/404,367

(22) Filed: Aug. 17, 2021

(65) Prior Publication Data
US 2021/0382935 A1 Dec. 9, 2021

Related U.S. Application Data

(63) Continuation of application No. 15/985,623, filed on May 21, 2018, now Pat. No. 11,120,070.

(51) Int. Cl.
*G06F 16/583* (2019.01)
*G06F 16/2457* (2019.01)
(Continued)

(52) U.S. Cl.
CPC ...... *G06F 16/583* (2019.01); *G06F 16/24578* (2019.01); *G06F 16/248* (2019.01);
(Continued)

(58) Field of Classification Search
CPC ..... G06F 16/22–248; G06F 16/51–583; G06F 18/22; G06F 3/04842;
(Continued)

(56) References Cited

U.S. PATENT DOCUMENTS

| 7,099,510 B2 | 8/2006 | Jones et al. |
| 7,657,100 B2 | 2/2010 | Gokturk et al. |

(Continued)

FOREIGN PATENT DOCUMENTS

| CN | 101473324 A | 7/2009 |
| CN | 103562911 A | 2/2014 |

(Continued)

OTHER PUBLICATIONS

"Office Action Issued in European Patent Application No. 19725465.9", Mailed Date: Jul. 12, 2022, 8 Pages.
(Continued)

*Primary Examiner* — Robert W Beausoliel, Jr.
*Assistant Examiner* — Nirav K Khakhar
(74) *Attorney, Agent, or Firm* — CALFEE, HALTER & GRISWOLD LLP

(57) ABSTRACT

A visual search system includes a computing device, where the computing device includes an image processing engine for generating a feature vector representing a user-selected object in an image. The computing device also includes, an object detection engine for locating one or more objects in the image and for determining a category of a user-selected object from objects in the image, where the object detection engine uses the category to generate a plurality of attributes for the user-selected object. The computing device further includes a product data store for storing a plurality of tables storing one or more attributes associated with a category of the user-selected object. The computing device additionally includes an attribute generation engine for generating a
(Continued)

plurality of attribute options and an attribute matching engine for comparing attributes and attribute options of the user-selected object with attributes and attribute options of visually similar products and images.

20 Claims, 7 Drawing Sheets

(51) Int. Cl.
| | | |
|---|---|---|
| *G06F 16/248* | (2019.01) | |
| *G06F 16/51* | (2019.01) | |
| *G06F 16/532* | (2019.01) | |
| *G06F 16/56* | (2019.01) | |
| G06F 18/22 | (2023.01) | |
| G06N 3/04 | (2023.01) | |
| G06N 3/08 | (2023.01) | |

(52) U.S. Cl.
CPC ............ *G06F 16/51* (2019.01); *G06F 16/532* (2019.01); *G06F 16/56* (2019.01); *G06F 18/22* (2023.01); *G06N 3/04* (2013.01); *G06N 3/08* (2013.01)

(58) Field of Classification Search
CPC ............... G06F 16/156; G06F 16/3326; G06F 16/5838; G06F 16/5846; G06F 16/5866; G06F 16/73; G06F 16/7847; G06F 16/9535; G06F 16/9538; G06F 18/24; G06F 3/013; G06F 3/0481; G06F 3/0482; G06F 3/0488
See application file for complete search history.

(56) References Cited

U.S. PATENT DOCUMENTS

| | | | |
|---|---|---|---|
| 7,813,561 B2* | 10/2010 | Jia ........................ | G06F 16/583 382/227 |
| 9,177,225 B1 | 11/2015 | Cordova-Diba et al. | |
| 9,442,985 B2* | 9/2016 | Wiegering .......... | G06F 16/9535 |
| 9,471,685 B1 | 10/2016 | Khafizov et al. | |
| 10,042,935 B1* | 8/2018 | Perkins ................. | G06F 16/538 |
| 10,360,705 B2 | 7/2019 | Cervelli et al. | |
| 10,444,940 B2 | 10/2019 | Cervelli et al. | |
| 10,789,525 B2* | 9/2020 | Kerr ...................... | G06F 16/583 |
| 10,810,252 B2* | 10/2020 | Kerr ......................... | G06N 3/08 |
| 2002/0044691 A1* | 4/2002 | Matsugu ................ | G06V 10/10 382/218 |
| 2006/0251338 A1 | 11/2006 | Gokturk et al. | |
| 2007/0081744 A1* | 4/2007 | Gokturk .................. | G06F 16/58 382/176 |
| 2007/0098211 A1 | 5/2007 | Walton et al. | |
| 2008/0082426 A1* | 4/2008 | Gokturk ............. | G06Q 30/0643 707/E17.014 |
| 2008/0144943 A1* | 6/2008 | Gokturk .............. | G06F 16/5862 382/224 |
| 2008/0152231 A1* | 6/2008 | Gokturk .............. | G06F 16/5838 382/209 |
| 2008/0177640 A1* | 7/2008 | Gokturk ................ | G06Q 30/02 705/26.62 |
| 2009/0208116 A1* | 8/2009 | Gokturk .............. | G06F 3/04847 382/209 |
| 2009/0208118 A1* | 8/2009 | Csurka ................... | G06V 20/10 382/228 |
| 2009/0245573 A1* | 10/2009 | Saptharishi ........ | H04N 5/23206 382/103 |
| 2010/0027895 A1* | 2/2010 | Noguchi .............. | G06V 10/771 382/224 |
| 2010/0260426 A1* | 10/2010 | Huang ................... | G06V 10/10 707/E17.031 |
| 2013/0114900 A1 | 5/2013 | Vedantham et al. | |
| 2013/0275411 A1 | 10/2013 | Kim et al. | |
| 2014/0016863 A1 | 1/2014 | Saxena et al. | |
| 2014/0029801 A1* | 1/2014 | Chua ...................... | G06V 10/50 382/103 |
| 2014/0180758 A1* | 6/2014 | Agarwal ................ | G06Q 30/06 705/7.29 |
| 2014/0365463 A1 | 12/2014 | Tusk | |
| 2014/0376819 A1 | 12/2014 | Liu et al. | |
| 2015/0134688 A1 | 5/2015 | Jing et al. | |
| 2015/0170333 A1 | 6/2015 | Jing et al. | |
| 2016/0350333 A1 | 12/2016 | Sacheti et al. | |
| 2017/0097948 A1* | 4/2017 | Kerr ...................... | G06F 16/532 |
| 2017/0287170 A1 | 10/2017 | Perona et al. | |
| 2018/0101570 A1* | 4/2018 | Kumar .................. | G06F 16/285 |
| 2018/0357258 A1* | 12/2018 | Bu ......................... | G06V 10/50 |
| 2019/0258895 A1 | 8/2019 | Sacheti et al. | |
| 2019/0294631 A1 | 9/2019 | Alcantara et al. | |
| 2019/0354609 A1 | 11/2019 | Huang et al. | |
| 2021/0382935 A1* | 12/2021 | Huang .................. | G06F 16/583 |

FOREIGN PATENT DOCUMENTS

| | | |
|---|---|---|
| CN | 105592816 A | 5/2016 |
| CN | 106560810 A | 4/2017 |

OTHER PUBLICATIONS

"Office Action Issued in Indian Patent Application No. 202047049142", Mailed Date: Sep. 2, 2022, 7 Pages.
"International Search Report and Written Opinion Issued in PCT Application No. PCT/US2019/030795", Mailed Date: Jul. 18, 2019, 12 Pages.
Szegedy, et al., "Deep Neural Networks for Object Detection", In NIPS'13: Proceedings of the 26 International Conference on Neural Information Processing Systems, vol. 2, Dec. 2013, pp. 2553-2561.
"Non-Final Office Action for U.S. Appl. No. 15/985,623", Mailed Date: Feb. 7, 2020, 21 Pages.
"Reply to Non-Final Office Action for U.S. Appl. No. 15/985,623", filed May 27, 2020, 17 Pages.
"Final Office Action for U.S. Appl. No. 15/985,623", Mailed Date: Jun. 30, 2020, 29 Pages.
"Reply to Final Office Action for U.S. Appl. No. 15/985,623", filed Aug. 31, 2020, 19 Pages.
"Advisory Action for U.S. Appl. No. 15/985,623", Mailed Date: Oct. 5, 2020, 5 Pages.
"Pre-Appeal Brief Conference Request for U.S. Appl. No. 15/985,623", filed Oct. 30, 2020, 7 Pages.
"Pre-Appeal Brief Conference Decision for U.S. Appl. No. 15/985,623", Mailed Date: Jan. 11, 2021, 2 Pages.
"Appeal Brief for U.S. Appl. No. 15/985,623", filed Feb. 26, 2021, 31 Pages.
"Notice of Allowance and Fees Due for U.S. Appl. No. 15/985,623", Mailed Date: May 14, 2021, 13 Pages.
Second Office Action Received for Chinese Application No. 201980034238.7, mailed on Aug. 8, 2024, 12 pages. (English translation Provided).
Office Action Received for Chinese Application No. 201980034238.7, mailed on Jan. 12, 2024, 12 pages.

* cited by examiner

SYSTEM AND METHOD FOR ATTRIBUTE-BASED VISUAL SEARCH OVER A COMPUTER COMMUNICATION NETWORK

RELATED APPLICATION

This application is a continuation of U.S. patent application Ser. No. 15/985,623, filed on May 21, 2018 and entitled "SYSTEM AND METHOD FOR ATTRIBUTE-BASED VISUAL SEARCH OVER A COMPUTER COMMUNICATION NETWORK", the entirety of which is incorporated herein by reference.

FIELD

The present disclosure relates generally to the field of computing and communications, and in particular but not exclusively, relates to a system and method for performing visual searches over computer communications networks using user-specified attributes of physical goods.

SUMMARY

A visual search system and method are described that use an image input received from the user of a mobile or other computing device as a search query to generate image search results of visually similar products and images. The image input can include one or more objects of interest to a user that are specially designated or identified in the image by the user. Once an object in an image is selected by a user, the visual search system and method determines a category for the object and then the attributes associated with objects in the category of the selected object. The combination of category and determined attributes enables the system and method to determine and display user-selectable options for each of the attributes associated with the user selected object. The search query, category, attributes and related attribute options are used in the visual search system and method to generate a listing of products and images that are visually similar to the user selected object.

In determining attribute options for display to a user, the system and method identify options and display them in order of a user's preferences, as determined from the monitoring of user selections for objects in the category, or in order of relative visual similarity to the user selected object. Attribute options are displayed within a user interface and once selected enable the search, identification and retrieval of products and images that are visually similar to the user selected object comprising the search query.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BACKGROUND

The continued growth in the use of the Internet for the search and retrieval of a vast array of information has created a need for enhanced capabilities to search, review, evaluate and display information in a variety ways and formats. Visual search capabilities are of increasing importance and new capabilities emerge virtually every day.

The current array of visual search services, however, often perform similar functions. Among the functions performed by these devices are the processing of images from online and offline sources using resources such as digital image capturing software and embedded cameras in mobile devices, respectively. These images can then be processed by these visual search services and used to locate products that are similar in structure or function to those shown in the images. Some contemporary visual search services can also be used to assist users in determining where to purchase products shown in these images, or even to find products that are similar in style or color to those shown in the received images.

Notwithstanding the significance of these remarkable advances, contemporary visual search services provide little to no ability to dynamically adapt or adjust the attributes associated with products of interest shown in received images prior to the execution of searches for these products. The visual search services also do not provide users with the ability to customize attributes associated with products prior to the execution of searches to find and display products with similar user-specified attributes.

Thus, there is a significant and rapidly growing need for an intelligent attribute-based visual search system and method that will empower users to dynamically interact with a visual search service and to interactively adjust the attributes of the products of interest in the images used by visual search services.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
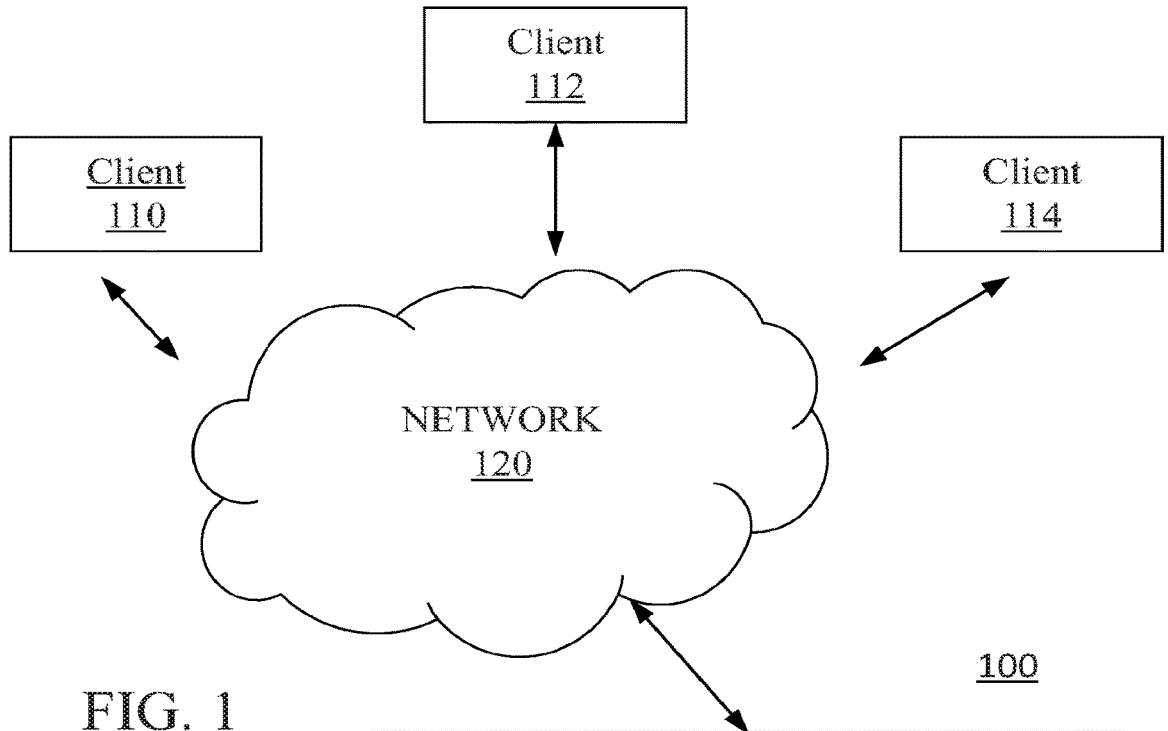
FIG. 1 is a illustration of an operating environment for a visual search system in an embodiment.

The example embodiments below concern a search method that can increase the relevance of returned visual search results. The examples described below allow users to designate the attributes of objects of interest in a received image, such as an image taken by the camera of a mobile device, while interacting with a visual search service prior to its execution of a customized visual search query that is produced, in part, from the user-specified attributes. In this manner, the user-specified attributes may be used to guide the visual search.

The technical effect of the embodiments described below concerns the determination of products from an attribute-based visual search process that are visually similar to a user selected object in a query image. These embodiments result in visual-based searches that are more efficient, more accurate and provide more relevant information to a user.

As described in more detail below, an example computing system generates a visual search query based on an object in a received image and user-specified attributes. The system analyzes the image using one or more object detection methods to classify and categorize the objects included in the image. The system retrieves a default set of pre-stored attributes associated with the category of a selected object, generates a set of attributes for the selected object, and then generates rank-ordered listings of attribute options to enable a user to customize the options associated with the selected object for the purpose of performing a visual search for products that are visually similar. The attribute options shown to a user are determined initially from pre-stored attributes associated with objects of a selected category but can be modified based on custom attribute options generated from the system. Once attribute options are selected by a user, the system can perform a visual search using a representation of an input query image, custom attribute options and a multi-layered learning-to-rank computational framework from which one or more ranked results of products and images related to the query image are produced.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are examples and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include microprocessors, digital signal processors (DSPs), microcontrollers, computer systems, discrete logic components, and/or custom logic components such as field programmable gate arrays (FPGAs), application specific integrated circuits (ASICs), programmable logic arrays (PLAs) or the like.

As to terminology, the phrase "configured to" encompasses any way that any kind of functionality can be constructed to perform an identified operation. The functionality can be configured to perform an operation using, for example, software, hardware, firmware, or the like. For example, the phrase "configured to" can refer to a logic circuit structure of a hardware element that is arranged to implement the associated functionality. The phrase "configured to" can also refer to a logic circuit structure of a hardware element that is arranged to implement the coding design of associated functionality of firmware or software. The term "module" refers to a structural element that can be implemented using any suitable hardware (e.g., a processor, among others), software (e.g., an application, among others), firmware, and/or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any non-transitory computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

FIG. 1 is an illustration of an exemplary environment 100 for an attribute-based visual search system. The environment may include one or more clients 110, 112, 114. Each client 110, 112, 114 may be configured to communicate with an visual search system 130 through a computer communication network 120. The network 120 may be a variety of network types including the public switched telephone network (PSTN), a cellular telephone network, and a packet switched network (e.g., the Internet).

In some implementations, each client 110, 112, 114 may include a desktop personal computer, workstation, laptop, smart phone, PDA, cell phone, or any WAP-enabled device or any other computing device capable of interfacing directly or indirectly with the network 120 such as a computing device 600 illustrated in FIG. 6. Each of the clients 110, 112, 114 may run an HTTP client, e.g., a browsing program, such as MICROSOFT INTERNET EXPLORER or other browser, or a WAP-enabled browser in the case of a cell phone, PDA or other wireless device, or the like, allowing a user of a client 110, 112, 114 to access information available to it at the visual search system 130 or to provide information to the visual search system 130. Other applications may also be used by any of the clients 110, 112, 114 to access or provide information to the visual search system 130, for example. In some implementations, the visual search system 130 may be implemented using one or more general purpose computing systems such as the computing device 600 illustrated in FIG. 5. In other implementations, the visual search system 130 may be implemented using special-purpose computing systems such as graphics processing units or tensor processing units.

In some implementations, the visual search system 130 may receive a query image from a user of a client 110, 112, 114 and search a corpus of product database images 190 (or any corpus of searchable images) to find matching images for the query image. The matching images may then be presented or identified to the user who submitted the query image. The matching images may comprise one or more images from one or more product databases 190. The product databases 190 may store images received or collected from one or more users, or store images displayed or presented on websites from commercial vendors of products. For example, the product databases 190 may store images collected from the Internet, such as images from social media sites, e-commerce stores or other commercial vendor websites. While the product databases 190 are illustrated as being directly connected to the visual search system 130, it is contemplated that the product databases 190 may be connected to the visual search system 130 via the network 120 or integrated directly into the visual search system 130.

The visual search system 130 processes images from search queries to generate image data. The visual search system 130 may include an image processing engine 140 to process an image into visual words that are generated from visual features detected in various regions of the images in received search queries, such as edges, corners, and blobs in the image. Given its informational content, a visual word can be used to represented an image as, for example, a histogram analysis of the number of times a visual word (e.g., a visual feature of relevance) occurs in the image. The image processing engine 140 may comprise an object detection engine 142 for performing object localization and object category classification and for determining and generating attributes of objects represented in the images of the search queries. An attribute generation engine 144 is also provided that continuously monitors user activity to learn patterns revealing user preferences for various types of objects. The attribute generation engine 144 generates attribute options based on such continuous monitoring as well as from a default set of pre-stored attributes in the product data store 192, in which category and attribute associations are stored, and as well as the attributes that are generated and received from the object detection engine 142. Rank-ordered listings of attribute options are then generated by the attribute generation engine 144 for each attribute based on the degree of visual similarity or likeness to user-selected objects in query images, or based on user preferences depending upon the frequency of occurrence of certain attribute options for attributes associated with objects which are frequently viewed, copied or stored. Once generated, the rank-ordered listings of attribute options can be presented on user interfaces to enable users to perform highly relevant, low latency searches for products and images related to a user-selected object in a query image.

In some implementations, the visual search system 130 may also include a similarity engine 150 that takes a query image and compares it to a retrieved database image from the product databases 190 to assess the level of similarity between the two. The visual search system 130 may also include a result ranking engine 160 that generates rank-ordered listings of attribute-matching search results based on a computed matching criteria. The visual search system 130 may further include an attribute matching engine 170 for generating search results with attributes that match the attributes of one or more user-selected objects in the images of the search queries. For some implementations, the visual search system 130 may also include a learning engine 180 for characterizing a user-selected object in a received search query and comparing the object to the products and images in the product databases 190 prior to the categorization of the user-selected object by the object detection engine 142.

Figure 2:
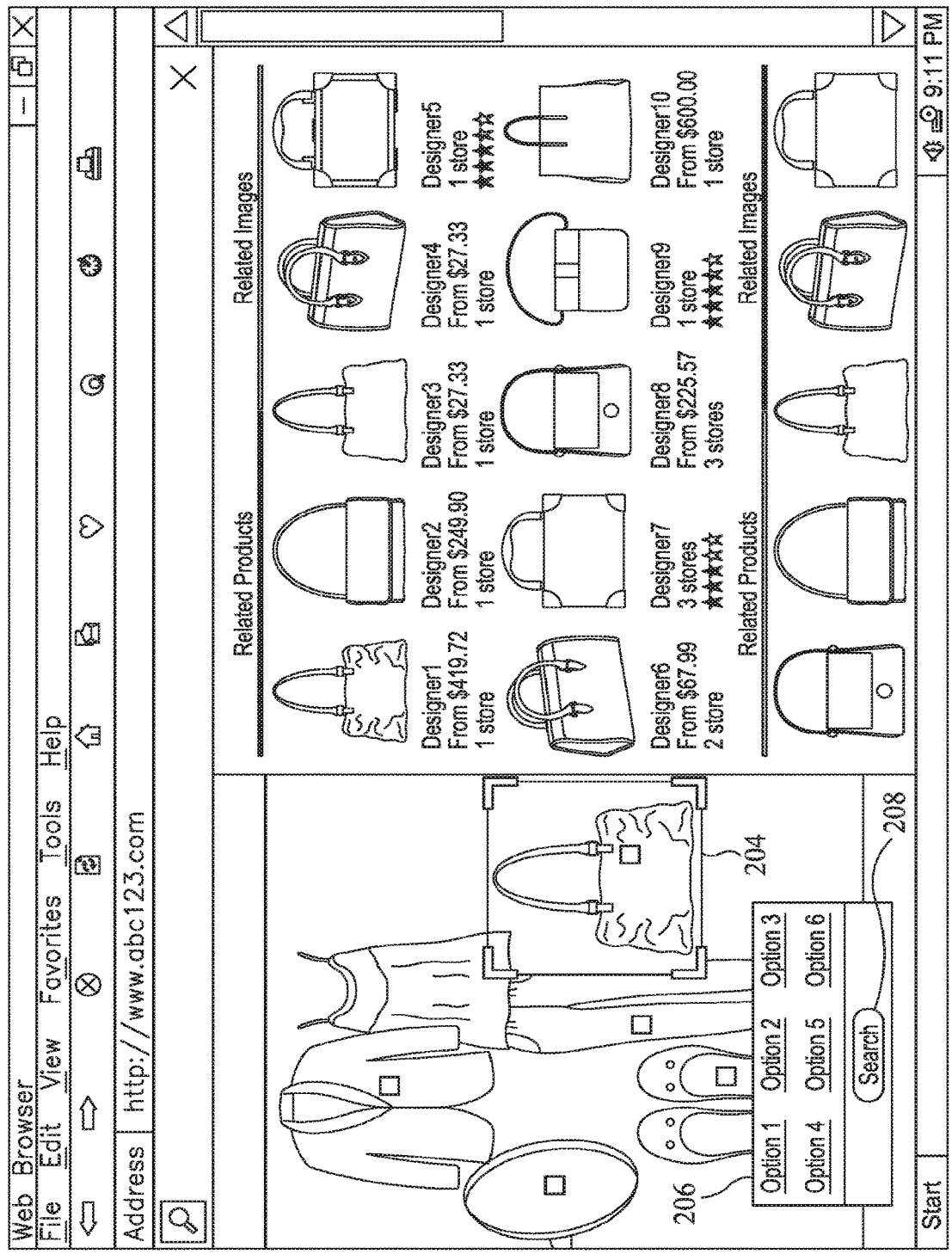
FIG. 2 is an illustration of a visual search performed on an interface of a desktop computer in an embodiment.

FIG. 2 is an illustration of a user interface on a desktop computer for a visual search system with intelligent attributes. The user interface 200 shows several objects that have been detected by an object detection engine. Each detected object is marked by a hotspot (square box markers on each object in the image) that can be clicked upon by a user. Alternatively, a user can specify a crop box 204, as shown in this example, to select a product of interest and to obtain visually similar products or images. After clicking upon either a hotspot or creating a cropped image box around an object of interest, a first selection region 206 appears, such as a pop-up window as shown in this example, showing several attributes and related attribute options that can be selected by a user to perform targeted attribute-based visual searches. In one operational embodiment, the attribute options for each pertinent attribute are presented in a rank-ordered list such that options determined to be consistent with a user's personal preferences are displayed ahead of other attribute options. These user preferences on applicable options for a selected object are determined from an embedded attribute generation engine that actively monitors user actions online to determine which options on products, or other objects of interest, have been selected with a greater frequency of occurrence. In an alternative embodiment, the attribute options are presented in the option selection region or window in a rank-order based on visual similarity with the user's selected object such that those attributes more closely matching the selected object appear first in order while those less similar appear lower in the rank ordering. In the illustrated example, if the user's purse selection was navy blue, several attribute options would appear in the selection region for a color attribute, such as Byzantine blue, light blue, baby blue, tar heel blue, blue-green, blue-gray, etc. Once suitable attribute options are selected, a user can commence a visual search by clicking a search button 208, resulting in, as illustrated, the display of visually similar related images and related products in a second region of the user interface. Although the embodiment depicted in this FIG. 2 shows six attribute options for a user to select, in practice the pop-up window or other display region can display any number of attributes and associated attribute options for review and selection by a user after an object of interest has been selected as determined from a clicking on a hotspot or the cropping of an object of interest in an image.

Figure 3:
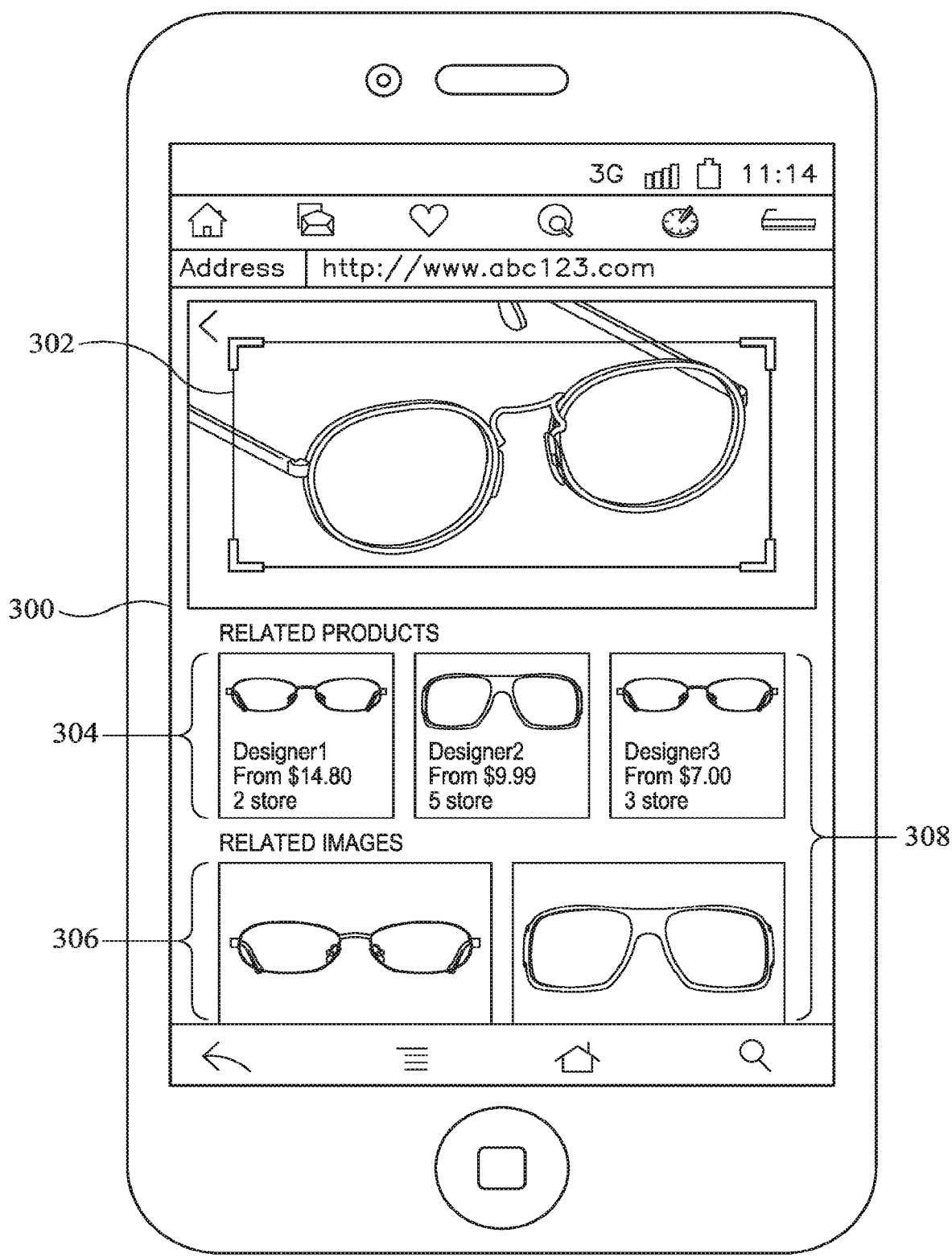
FIG. 3 is an illustration of a visual search performed on an interface of a mobile device in an embodiment.

FIG. 3 is an illustration of a user interface on a mobile device. This embodiment of a user interface 300 on a mobile device includes a cropped image 302 of a selected object which when selected generates a custom options first region area (e.g., a pop-up window) in which several customization options 303 (not shown) are depicted related to attributes for a selected object and as well as a search button 305 (not shown). The options shown in this region appear in a rank-ordered listing and can be displayed based on learned user preferences or based on relative visual similarity to the selected object as determined from a visual analysis of the object and its unique attributes (e.g., size, color, style, etc.). After clicking on the search button 305, a series of related products 304 and related images 306 are displayed in a second region 308 beneath the location of the crop box of the selected object. This second region 308, in the illustrated embodiment, collectively includes the areas in which the related products 304 and related images 306 appear. As is known by those skilled in the art, other regions or zones can be used to depict such products and information, such as pop-up windows, or other moveable regions. It should be noted that images can be obtained from a stored repository of photos on a mobile device, on a hard drive, copied from a website or social media site (e.g., Pinterest, Facebook, etc.) from any other location on the Internet or other networks or merely by the taking of photographs from the embedded camera of the mobile device. Regardless of the source of the original received image, a user may review the image and select an object within the image for assistance identifying related products and images available online.

Figure 4A:
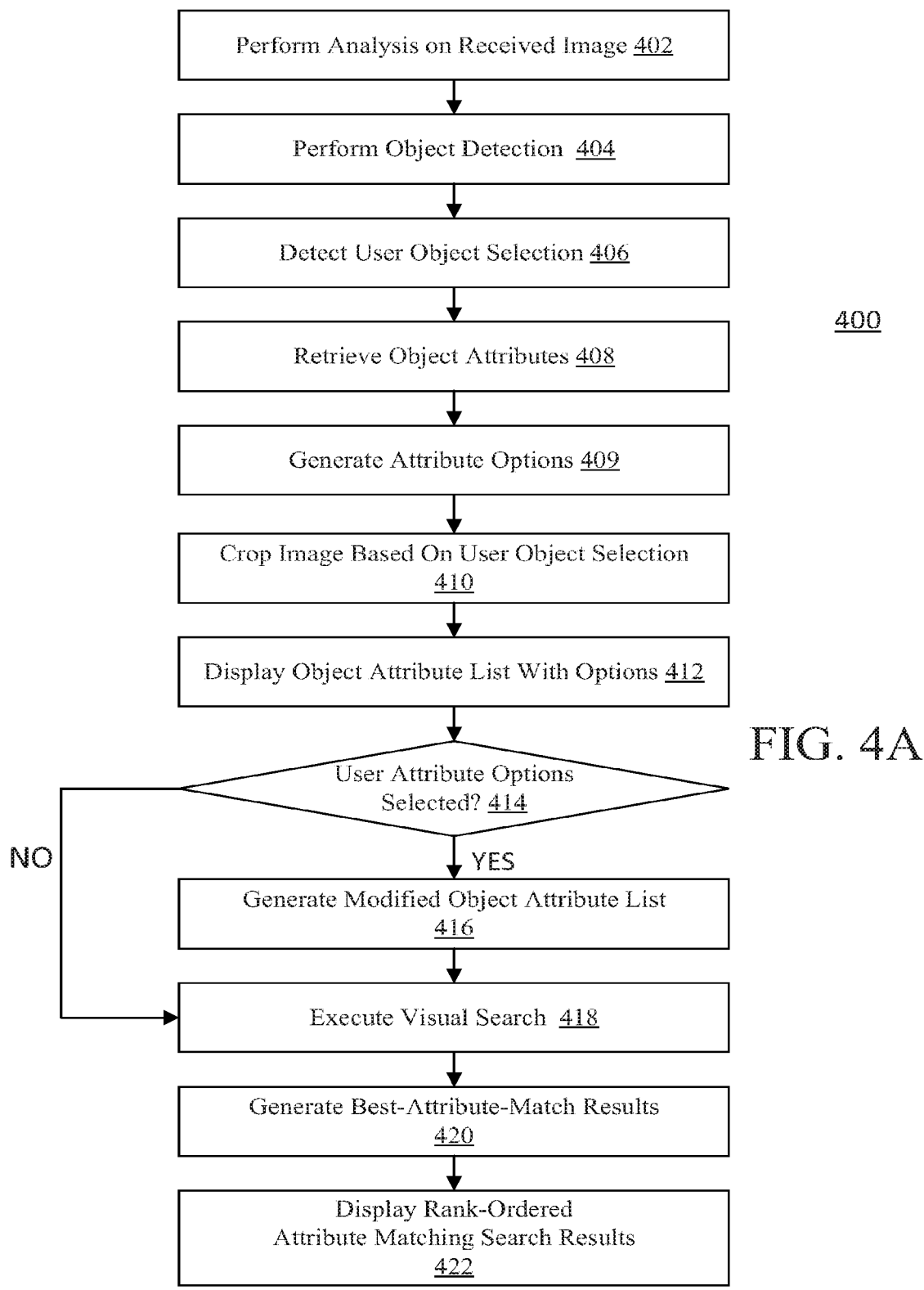
FIG. 4A is a flow chart illustrating an embodiment of a method for performing attribute-based visual searches.

FIG. 4A is a flow chart illustrating an embodiment of a method performed for attribute-based visual search. When an image (e.g., a stored photo, an image taken from an online site (e.g., Instagram, Pinterest, Twitter, etc.) is received on a device (e.g., a mobile phone, a personal computer, a laptop computer, etc.), preliminary image processing is performed to analyze and characterize the content of the image, as shown at step 402. After characterization of the content in the image, an object detection process is executed, as shown at step 404 to recognize objects in the image and their locations in the image, including objects in the image with limited clarity or visual acuity, such as objects which are truncated or occluded. The object detection process performs several related processes, including object localization and object category classification (i.e., object categorization) to fully characterize an image and the objects illustrated in it. In addition, the object detection process performed at step 404 detects unique characteristics and qualities of objects appearing in received images, including the detection and determination of physical and visual attributes, such as object color, object shape, object length, object type, etc. When determining object type, the object detection process uses the object category classification to determine attributes that are unique to the detected object (e.g., object category of "dress" enables an object type attribute to be one of a set including casual, cocktail, formal, wedding, etc.). Illustrative examples of other types of category-specific attributes with application in the fashion and sports apparel field are listed below.

For a dress, the following are representative examples of attributes:
  Attributes_Type: Casual, Cocktail, Formal, Wedding
  Attributes_Style: Fit_Flare, Fitted, Gown, Maxi, Straight
  Attributes_Hemline: Short, Kee-Length, Midi, Long, High Low
  Attributes_Neckline: Boat_Neck, Collared, Halter, High Neck, Off_the_Shoulder
  Attributes_SleeveType: Strapless, Sleeveless, Short_Sleeve, ¾_Sleeve, Long_Sleeve
  Attributes_Pattern: Animal_Print, Floral, Geometric, Graphic, Ombre, Plaid, Polka Do
  Attributes_Size: Regular 0-20, Petitie 0-16, Plus 0-4X, Maternity 0-18
  Attributes_Color: Black, Grey, Whilte, Brown, Purple, Blue, Yellow, Orange, Red, etc.

For shoes, the following are representative examples of attributes:
  Attributes_Type: Booties, Boots, Flats, Heels, Sandals, Slippers, Sneakers & Athletic
  Attributes_Occasion: Bride, Casual, Dress, Party & Evening, Vacation, Wedding, etc.
  Attributes_HeelHeight: Flat Heel, Low Heel, Medium Heel, High Heel, Ultra High Heel
  Attributes_ToeStyle: Closed Toe, Open Toe, Peep Toe, Pointed Toe, Round Toe
  Attributes_Width: 4A Super Slim, 3A Slim, 2A Narrow, B Medium, C Wide, E X-Wide
  Attributes_Size: 4, 4.5, 5, 5.5, 6, etc.
  Attributes_Color: Black, Grey, White, Brown, Purple, Blue, Yellow, Orange, Red, etc.

Object localization is the process of determining a specific location of an object in a processed image. In images with multiple objects, the object localization process identifies, locates and sets upon identified objects a bounding box or other digitized marker that is used to identify and establish the location of an object relative to other objects in an image. Object category classification is a process used to determine the category of an object, which process will be referred to as object categorization. For example, if an image portrays a glass of wine, a cat and a gift box, the three objects can be identified and located relative to each other and within the setting of the entire image using the object localization process. Concurrently, each object can be categorized broadly, which in this case would be gift box, animal and beverage. In addition to its role in determining an object's broad category, the object categorization process can also be used to determine a set of attributes for each detected object within an image. In alternative embodiments of the visual search system and method, one or more object detection algorithms may be applied to perform object localization and object category classification. Among the different types of algorithms that have been used for object detection are the Single Shot Multi-Box ("SSD") detection algorithm. The SSD is a single deep neural network that can establish a default set of bounding boxes over an image space and scales per feature map location. An SSD algorithm generates scores representing the presence of each object in an image and adjusts applicable bounding boxes to achieve a better match for an object shape. This method combines predictions with multiple feature maps to handle objects of varying sizes, including objects that are truncated or otherwise have limited resolution in an image. Alternatively, the Faster R-CNN algorithm, or Faster Region Convolutional Neural Network, has been applied to both object localization and object categorization. This algorithm is comprised of two networks, a region proposal network and an object detection network that uses the proposals generated by the region proposal network. The region proposal network ranks region bounding boxes computed for an image and proposes the most likely to contain relevant objects as foreground bounding boxes. The various bounding boxes/region proposals generated by the region proposal network are processed by a foreground-background classifier and a bounding-box regressor to check for the occurrence of objects and their respective positioning within the query image (e.g., foreground, background, etc.). The role of the region proposal network is to predict which bounding boxes are background or foreground in an image and to refine the predictions to achieve a high level of accuracy.

Referring now to step 406, after analysis and characterization of image content using the object detection process, an object selection request can be detected based on an action of a user, such as a clicking on a hotspot, or the cropping of an object within an image, or a selection by a finger touch or a tapping of a stylus on an object depicted in the image shown on a mobile device user interface. Upon detection of a user object selection, a feature extraction process is performed on the selected object resulting in the generation of a query image. The query image, in one embodiment, is the image created from the juxtaposition of a crop box onto the selected object shown in a received image (i.e., the stored, copied or retrieved photo received from a user). In an alternative embodiment, the query image is generated from a clicking upon a hotspot marking the object of interest in a received image. The feature extraction process determines the unique visual properties of the selected object comprising the query image and produces a feature vector based on the query image. The feature vector is a digitized representation of visually relevant features in the query image (e.g., edges, contours, blobs, etc.). In addition to the generation of a feature vector, the process retrieves object attributes associated with the category determined for the selected object, as shown at step 408, and then combines the generated attributes produced during the object detection process (shown at step 404) with the retrieved object attributes 408 to generate attribute options 409 for the combined set of attributes. The generated attribute options 409 are produced from a rule-based attribute option generation process in one embodiment, while in an alternative embodiment the generated attribute options 409 are produced from a model-based attribute option generation process. The rule-based attribute option generation process uses the object category to determine what attributes are to be retrieved, as shown at step 408, from one or more tables stored in a database in which associative arrays or similar data structures are used to store associations between categories and a pre-defined set of attributes. In addition, each attribute has an associated set of options (e.g., Attribute: Dress; Attribute Options: Cocktail, Formal, etc.) and each of the attribute options that are generated, at step 409, for each attribute associated with an object can be presented in an ordered list or other rank-ordered manner based on user preference (as determined from a frequency of occurrence analysis). The rank-ordered listing of options for each attribute based on user preference is determined using an Attribute Generation Engine 144, as shown in FIG. 1 above. The Attribute Generation Engine 144 continuously monitors user actions to discern patterns of choices for objects of different types and develops a user preference profile based on the frequency of occurrence of such choices. This user preference profile enables the Attribute Generation Engine 144 to generate and display user selection preferences as options for each attribute for an object within a specific category. The monitoring of such use patterns enables the visual search or shopping experience to be more convenient and targeted to the preferences and/or interests of each user.

Alternatively, and as mentioned previously, the generated attribute options 409 can be produced from execution of a model-based attribute option generation process. The model-based attribute option generation process is performed when a user selection of an object is detected, as shown at step 406, and entails, in a first embodiment, the processing of the selected object image on a deep neural network that is trained over multiple observations to discern and learn the relationship or similarity between the content of an image (e.g., a query image), a set of attributes and a range of attribute options. In this first embodiment, the deep neural network can implement a LambdaMART ranking model for the generation of ranking scores that enable the generation of rank-ordered listings of attribute options according to visual similarity to the object selected in the query image. For example, a red dress shown in the query image and selected by a user will result in the generation of attribute options for an attribute such as "color" in a rank-ordered listing (e.g., light red, rose, pink, fuchsia, purple, etc.) of decreasing visual similarity. Likewise, for the attribute of "dress hat" a rank-ordered listing presenting options of decreasing visual similarity may be presented (e.g., fedora, beret, beanie, baseball cap, etc.).

In an alternative embodiment, after detecting a user object selection 406, a deep neural network is used to process the attributes generated during the performing of the object detection process, as shown at step 404, based on training data and a training model that enables the network to learn the similarities between attributes and attribute options. The trained network is used to generate a similarity score for each attribute pair (i.e., initial attribute, attribute option) and to rank these pairs based on their respective similarity score. This ranking of these paired associations between attribute and attribute option is used to generate and display rank-ordered listings of attribute options based on visual similarity such that attribute options are presented for each available attribute displayed for an object in an order of decreasing similarity or likeness to the object depicted in an query image.

Once an object in a query image is selected, a cropped image of the user's object selection will appear on the user interface or, alternatively, the object will be marked with a hotspot icon, as shown at step 410. Once a cropped image for a user-object-selection is generated, in an embodiment a pop-up window appears that displays an object attribute list, as shown at step 412, associated with the user selected object. The displayed object attribute list provides custom options for all or a subset of the object's attributes that may be clicked upon by a user who has distinct or specialized preferences for the detected object. The system detects or awaits user input of user-selected object attribute options, as shown at decision point 414, before generating a modified object attribute list, as shown at step 416. The modified object attribute list 416 is comprised of a combination of object attributes generated from the object detection process (shown at step 404) and the retrieved attributes (shown at step 408) and the rank-ordered listing of attribute options for each attribute in the combined set of generated attributes and retrieved attributes. As discussed previously, the options for each attribute can be rank-ordered according to user preference based on a frequency of occurrence analysis, in one embodiment, or, in an alternative embodiment, according to relative visual similarity to the object in the query image. If no user attribute options are selected, a visual search is executed, as shown at step 418, using as inputs a feature vector representing the query image (i.e., the user-selected object), the combined set of displayed object attributes (i.e., the generated attributes and retrieved attributes) and related options (shown at step 412) followed by the generation of best-attribute-match results, as shown at step 420, and the display of a rank-ordered listing of the best-attribute-match search results, as shown at step 422, ranked from the most-visually-similar result to the least-visually similar result relative to the user-selected object in the query image.

Execution of the visual search, as shown at step 418, involves the processing of the feature vector, which was generated from the feature extraction process performed on the query image, in a multi-layered learning-to-rank computational framework which enables the operation of a visual search engine. This visual search engine framework produces a systematic quantized reduction of the information contained in the representation of the image in the feature vector and is comprised of several computing components including a visual word quantization component at an initial matching level (i.e., L0-matching), a product quantization component at a secondary interim result ranking level (i.e., L1-ranking), and a final full result ranking component (i.e., L2-ranking) for ranking identified search results that have visually similar properties with matching or related attributes to those of a user-selected object represented in the feature vector. The framework involves the transformation of the feature vector into a visual-word-quantized representation (i.e., a "visual word vector") of the query image followed by a product quantization of the visual word vector. The product-quantized-vector produced from the product quantization process is then used to perform a full-fledged result search across one or more product databases, including publicly accessible databases available from commercial vendors, academic centers, non-profit organizations, and trade organizations, etc., and a ranking of search results to produce listings of products and images that are similar or related to those of the query image. The source of the product images can be an image index of pre-stored images compiled from data sources across the Internet, or other public or private computer networks, and from one or more product or vendor databases on which visual representations of products are provided in the form of images. The products and images that are visually similar to the user-selected object(s) in the received image with the same or visually similar attributes (e.g., sleeveless, red formal dress, etc.) are displayed in rank-order with exact match results presented first followed by visually similar results with matching attribute options in relevance-ranked order (e.g., object selected: yellow dress with paisley pattern; relevance-ranked results: yellow dress with small stars in pattern, light orange dress with small circles in pattern, etc.).

The category identified from a category recognition process performed during object detection, step 404, can be used as an index for accessing category-associated attributes stored in a database, such as an inverted index database or a key-value database, that enables fast identification and retrieval of attribute sets associated with products in a given category. The generation of best-attribute-match search results, shown at step 420, uses an attribute matching engine for fast comparison, analysis and matching of text and other metadata for products and images that are related to a user-selected object in a query image. The results are assigned a ranking weight based on the degree of similarity between the attributes of a user-selected object present in a query image and the attributes of related products and product images in the same category. A database implementing an inverted index data structure using associative arrays that saves associations between categories and attributes enables the fast identification and comparison of products having the same (or similar) attributes and the assignment of greater ranking weight to visually similar products and/or images with attributes that match or are semantically similar to those of the user-selected objects. A result ranking engine performs the sorting of these best-attribute-match search results and the displaying to a user of a rank-ordered listing of search results, as shown at step 422.

Figure 4B:
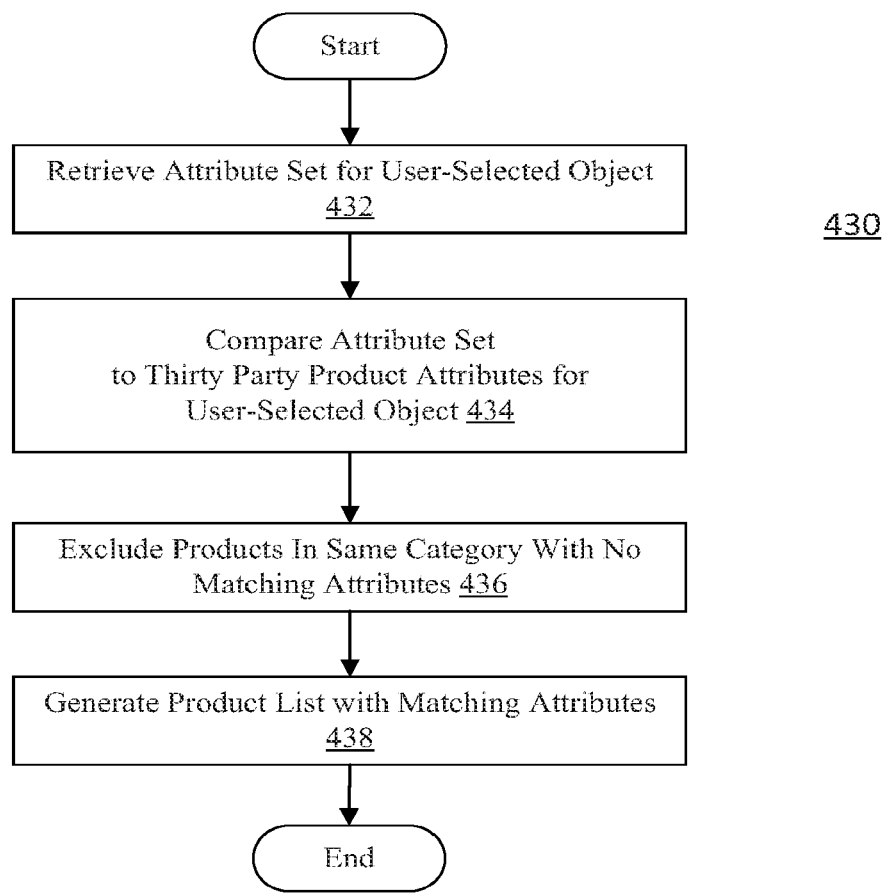
FIG. 4B is a flow chart illustrating an embodiment of a method for attribute-based visual search result matching.

FIG. 4B illustrates a process 430 for attribute matching in a visual search system and is intended to expand upon the steps performed at step 420 in FIG. 4A. This process 430 starts with the retrieval of attributes for a user-selected object, as shown at step 432, including the compilation of a set of attributes generated from user-selected custom options for the retrieved attributes, and their comparison to third-party product attributes for products that are similar to the user-selected object shown in a received image. This comparison step, as shown at step 434, can include a comparison of textual or other metadata associated with third-party product descriptions or attributes to the attribute set for the user-selected object as retrieved from an index image database. The custom options are determined and set by users prior to the execution of a visual search to ensure that all search results retrieved match a user's desired product attributes as closely as possible. During the comparison of attributes between those specified for a user-selected object and the attributes of third-party products, a process is performed to exclude products within the same category that have no matching attributes relative to the set of attributes for the user-selected object, as shown at step 436. This exclusion process reduces the level of processing performed and helps to increase the overall speed of the process for revealing a set of products that are the very best match possible for a given set of attributes associated with a user-selected object. Once compiled, the reduced or refined list of products is generated based on the best-attribute-match achieved, as shown at step 438.

Figure 4C:
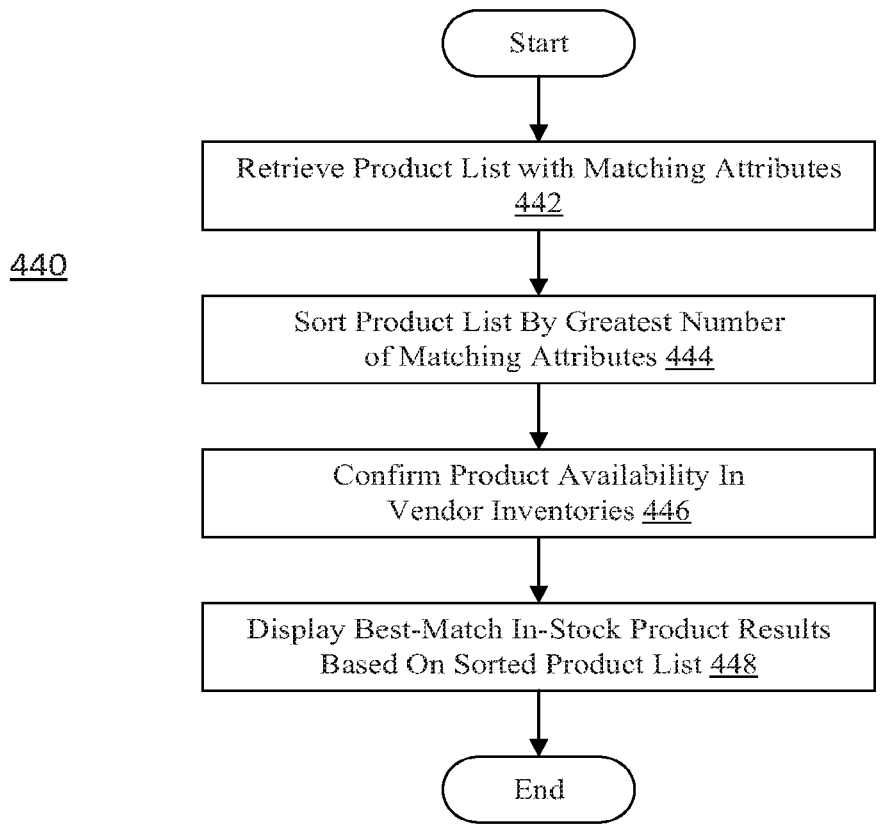
FIG. 4C is a flow chart illustrating an embodiment of a method for ranking attribute-based visual search results.

FIG. 4C illustrates a process 440 for result ranking using weighted search results. A product list with matching attributes is retrieved from an attribute matching engine, as shown at step 442. This product list is displayed in proximity to a user-selected object on a user interface as related products and related images. These search results are produced after a user clicks upon a hotspot centered on an object in a processed image or applies a crop box on an object of interest in a processed image. This ranker is used to sort the retrieved product list by the greatest number of matching attributes, as shown at step 444. A matching criteria based upon one or more statistical optimization processes is applied in a learning-to-rank computational framework to identify visually similar products and/or images with attributes that are the same or similar to those for the user-selected object. In one embodiment, an optimization process applies a K-Means clustering technique to a corpus of index images while applying a deep neural network to the query image to generate a feature vector that will be a representation of the image in terms of a set of visual words (i.e., a visual-word-quantized representation). An n-nearest neighbor centroid statistical technique is applied to the clustered data and the feature vector to generate a visual word quantized representation of the query image. The n-nearest neighbor centroid statistical analysis technique enables visually similar products and/or images to be established based on the distances between the statistical means of centroids in a cluster of data. Centroids with statistical means farther from the statistical mean of a centroid representing the query image are determined to be more different (or, alternatively, statistically less relevant) while those centroids with statistical means closer to the statistical mean of a centroid representing a query image are determined to be more alike (or, more relevant) and thus more visually similar to the query image.

The attribute set of a user-selected object can be based on a set of attributes pre-stored for a given object category or a set of one or more custom options designated by a user for each of the attributes in the set of attributes in the pre-stored list. Afterwards, attributes are assembled and compared to the attributes of the retrieved set of products in a product list. After a product list is generated with products having the greatest number of matching attributes, individual vendor websites are checked to determine what inventory availability applies to each of the products on the sorted product list. This confirmation of product availability, as shown at step 446, ensures that the best match of products can be generated based on visual similarity to a user-selected object and product availability in vendor inventories. After identifying attribute-matching products and confirming product availability in vendor inventories, the products are sorted and displayed in attribute-match ranked order starting with exact-match products, as shown in step 448, for review by the user.

Figure 5:
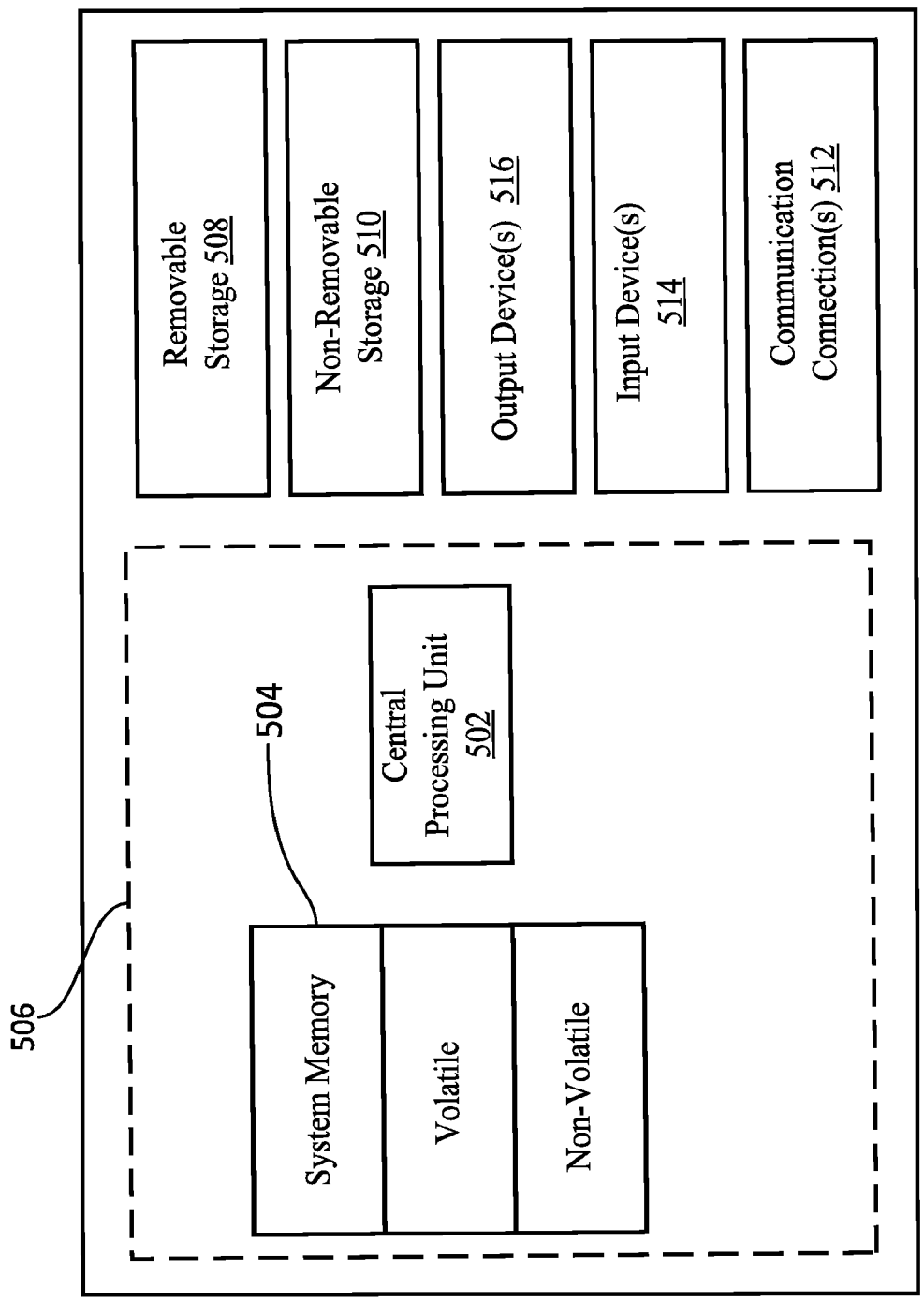
FIG. 5 shows an exemplary computing environment.

FIG. 5 shows an exemplary computing environment in which example implementations and aspects may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CDROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   a hardware processor; and
   at least one memory device storing instructions that, when executed by the hardware processor, cause the hardware processor to perform acts comprising:
      obtaining an image, wherein the image is displayed to a user;
      in response to receiving an indication that an object in the image has been selected by the user, generating a feature vector that represents the object;
      determining a category of the object based upon the feature vector;
      retrieving a plurality of attributes based upon the category of the object, wherein the plurality of attributes comprise one or more first attributes and one or more second attributes, wherein the one or more first attributes are indicative of a feature of the object and the one or more second attributes are indicative of a feature of at least one other object in the category but are not indicative of the object;
      generating a plurality of search results based upon the feature vector and the plurality of attributes; and
      causing the plurality of search results to be displayed within a graphical user interface (GUI).

2. The computing system of claim 1, wherein the plurality of search results comprise images that include objects belonging to the category of the object displayed in the image.

3. The computing system of claim 2, wherein the plurality of search results further comprise descriptions of each of the objects.

4. The computing system of claim 1, wherein the plurality of search results include a first image that includes a first object, wherein the first object has the at least one of the one or more second attributes in place of the one or more first attributes.

5. The computing system of claim 1, wherein the image comprises a plurality of objects, the acts further comprising:
   prior to generating the feature vector, identifying the object from amongst the plurality of objects in the image.

6. The computing system of claim 1, wherein a second object is in the image, wherein generating the feature vector that represents the object in the image comprises:
cropping the image to generate a query image, wherein the query image includes the object, wherein the query image excludes the second object, wherein the feature vector is generated based upon the query image.

7. The computing system of claim 1, the acts further comprising:
obtaining user preferences of the user; and
subsequent to generating the plurality of search results and prior to causing the plurality of search results to be displayed within the GUI, assigning rankings to the plurality of search results based upon the user preferences, wherein the plurality of search results are displayed in accordance with the rankings.

8. The computing system of claim 1, wherein generating the plurality of search results based upon the feature vector and the plurality of attributes comprises:
identifying a database from amongst a plurality of databases based upon the category of the object; and
executing a search over the database based upon the feature vector and the plurality of attributes, wherein the plurality of search results are generated from the search.

9. The computing system of claim 1, wherein the image is obtained from a computing device operated by the user, wherein the GUI is presented on a display of the computing device.

10. The computing system of claim 1, wherein the image is obtained from a server computing device.

11. The computing system of claim 1, wherein retrieving the plurality of attributes comprises executing a rule assigned to the category.

12. A method executed by a processor of a computing system, the method comprising:
obtaining an image, wherein the image is displayed on a display of a computing device operated by a user;
identifying a plurality of objects in the image;
upon identifying the plurality of objects in the image, determining respective categories of each of the plurality of objects in the image;
in response to receiving an indication that an object in the plurality of objects in the image has been selected by the user, generating a feature vector that represents the object;
retrieving a plurality of attributes based upon a category of the object, wherein the plurality of attributes comprise one or more first attributes and one or more second attributes, wherein the one or more first attributes are indicative of a feature of the object and the one or more second attributes are indicative of a feature of at least one other object in the category but are not indicative of the object;
generating a plurality of search results based upon the feature vector and the plurality of attributes; and
causing the plurality of search results to be displayed within a graphical user interface (GUI) shown on the display.

13. The method of claim 12, wherein each of the plurality of objects in the image is marked with a respective icon, wherein the object is selected when an icon assigned to the object is selected by the user.

14. The method of claim 12, wherein generating the plurality of search results based upon the feature vector and the plurality of attributes comprises:
generating a visual-word-quantized representation of the object based upon the feature vector;
generating a product quantized representation of object based upon the visual-word-quantized representation of the object; and
executing a search over at least one database based upon the product quantized representation of the object and the attribute set, wherein the plurality of search results are generated based upon the search.

15. The method of claim 12, further comprising:
obtaining user preferences of the user; and
subsequent to generating the plurality of search results and prior to causing the plurality of search results to be displayed within the GUI, assigning rankings to the plurality of search results based upon the user preferences, wherein the plurality of search results are displayed in accordance with the rankings.

16. The method of claim 12, wherein generating the feature vector that represents the object in the image comprises:
cropping the image to generate a query image, wherein the query image includes the object, wherein the feature vector is generated based upon the query image.

17. The method of claim 12, wherein the plurality of search results comprise images that include objects that belong to the category of the object displayed in the image.

18. A non-transitory computer-readable storage medium comprising instructions that, when executed by a processor of a computing system, cause the processor to perform acts comprising:
obtaining an image, wherein the image is displayed within a graphical user interface (GUI) shown on a display of a computing device;
in response to receiving an indication that an object in the image has been selected by a user of the computing device, generating a feature vector that represents the object;
determining a category of the object based upon the feature vector;
retrieving a plurality of attributes based upon the category of the object, wherein the plurality of attributes comprise one or more first attributes and one or more second attributes, wherein the one or more first attributes are indicative of a feature of the object and the one or more second attributes are indicative of at least one other object in the category but are not indicative of the object;
generating a plurality of search results based upon the feature vector and the plurality of attributes; and
transmitting the plurality of search results to the computing device, wherein the plurality of search results are displayed within the GUI.

19. The non-transitory computer-readable storage medium of claim 18, wherein the image is displayed at a first region of the GUI, wherein the plurality of search results are displayed at a second region of the GUI.

20. The non-transitory computer-readable storage medium of claim 18, wherein the at least one additional attribute belongs to the category.

* * * * *